(12) United States Patent
Nakano

(10) Patent No.: US 7,868,959 B2
(45) Date of Patent: Jan. 11, 2011

(54) LIQUID CRYSTAL DISPLAY DEVICE HAVING COMMON ELECTRODES FORMED OVER THE MAIN FACE OF AN INSULATING SUBSTRATE AND MADE OF A COATING TYPE ELECTROCONDUCTIVE FILM INSIDE A BANK TO REGULATE THE EDGES THEREOF

(75) Inventor: Keiko Nakano, Yokohama (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 414 days.

(21) Appl. No.: 11/943,701

(22) Filed: Nov. 21, 2007

(65) Prior Publication Data

US 2008/0212009 A1  Sep. 4, 2008

(30) Foreign Application Priority Data

Nov. 21, 2006 (JP) ............................. 2006-313871
Nov. 21, 2006 (JP) ............................. 2006-313872

(51) Int. Cl.
G02F 1/136 (2006.01)
(52) U.S. Cl. ....................................... 349/43
(58) Field of Classification Search .............. 349/43
See application file for complete search history.

(56) References Cited

U.S. PATENT DOCUMENTS 5,989,945 A    11/1999  Yudasaka et al.
6,356,331 B1    3/2002  Ono et al.
2004/0004678 A1  1/2004  Furusawa
2006/0121745 A1* 6/2006  Fujii .......................... 438/790
2006/0208624 A1  9/2006  Yoshimoto
2006/0256276 A1 11/2006  Sha et al.

FOREIGN PATENT DOCUMENTS

| JP | 2003-318193 | 11/2003 |
|---|---|---|
| JP | 3725169 | 9/2005 |
| JP | 2006-190852 | 7/2006 |
| JP | 2006-195142 | 7/2006 |
| JP | 2006-308922 | 9/2006 |

* cited by examiner

Primary Examiner—John Heyman
(74) Attorney, Agent, or Firm—Antonelli, Terry, Stout & Kraus, LLP.

(57) ABSTRACT

In a liquid crystal display panel of a type having common electrodes, one solidly formed for each pixel, over the main face of an insulating substrate and a comb-shaped pixel electrode over the common electrodes via an insulating film, the patterning of the common electrodes is accurately accomplished without using sputtered film formation or a photolithographic step. A bank 50 for common electrodes is formed simultaneously with a gate wiring/electrode 3 and common electrode wiring 10 to be formed over the main face of an insulating substrate 1 and, by applying electroconductive ink to the inside surrounded by this bank 50, the common electrodes 2 are formed without using photolithography.

20 Claims, 15 Drawing Sheets

LIQUID CRYSTAL DISPLAY DEVICE HAVING COMMON ELECTRODES FORMED OVER THE MAIN FACE OF AN INSULATING SUBSTRATE AND MADE OF A COATING TYPE ELECTROCONDUCTIVE FILM INSIDE A BANK TO REGULATE THE EDGES THEREOF

CLAIM OF PRIORITY

The present application claims priority from Japanese Application JP 2006-313872 filed on Nov. 21, 2006 and Japanese Application JP 2006-313871 filed on Nov. 21, 2006, the content of which is hereby incorporated by references into this application.

BACKGROUND OF THE INVENTION

1. Field of the Invention

The present invention relates to a liquid crystal display device and a manufacturing method thereof, and more particularly to what is suitable for an in-plane type liquid crystal display device embodying an attempt to reduce the overall cost by curtailing the formation step of a common transparent electroconductive film in the in-plane system.

2. Description of the Related Art

Liquid crystal display devices are extensively used as typical flat panel displays (FPDs). Basic structures of a liquid crystal display device can be broadly classified into two systems. One is the so-called twisted nematic system (commonly known as the TN system) in which a pixel electrode is formed over one of two substrates and a common electrode (counter electrode or common electrode) is formed over the other to form an electric field between the two electrodes and the alignment of liquid crystal molecules is controlled. The other is the so-called in-plane system (commonly known as IPS) in which a pixel electrode and a common electrode (counter electrode) are formed on one of two substrates and substantially in parallel to the surface of the substrate and the alignment of liquid crystal molecules is controlled with an electric field formed between the two electrodes. Further, various derivatives from these systems have been proposed and put into actual use.

Among liquid crystal display devices of these systems, the in-plane system has such advantages as a wide field of view and a high production yield due to the configuration in which both the pixel electrode and the common electrode on one substrate (usually they are formed on the substrate on which a thin film transistor is formed: the thin film transistor substrate or TFT substrate) to allow a greater tolerance of alignment with the other substrate (which usually is configured as a color filter substrate (CF substrate) by forming color filters).

In a liquid crystal display device of the in-plane system, an effective display area in which a large number of pixel circuits made up of thin film transistors are arranged in a matrix and external circuits including a driving circuit for controlling the turning on/off of pixels outside this effective display area are installed or formed on the main face of the TFT substrate, which is one of the substrates of the system. On the other hand, color filters of three colors including R (red), G (green) and B (blue) are usually formed on the main face of the CF substrate, and the CF substrate and the TFT substrate are stuck together with their main faces meeting each other, with liquid crystals being sealed between the stuck faces. The present invention relates to an in-plane type liquid crystal display device, in particular to the common electrodes provided on the TFT substrate side and the formation thereof.

Although color filters are arranged on the TFT substrate side in some cases, no detailed description will be made of them herein because the invention is not relevant to color filters.

FIG. 1 shows a section of one pixel to illustrate a structural example of a conventional TFT substrate. For this TFT substrate, an inorganic substrate of glass or the like or an organic film of heat resistant plastic or the like is used, and a thin film transistor, a pixel electrode and a common electrode are formed on its main face (the inner face to configure the TFT and so on). In the following description, the use of a transparent glass substrate is supposed. Referring to FIG. 1, a TFT part TFT has a laminated structure including a metal film 3 (of aluminum (Al) or some other metal) over the main face of a glass substrate 1. In a pixel aperture part PX, there is an ITO film as a common electrode 2 on the same layer as gate electrode/gate wiring 3. In a common wiring part (a power feed part for the common electrode) CL, an upper common electrode 2A is stacked over the metal film (of aluminum (Al) or some other metal) over the ITO film forming the common electrode 2.

A gate insulating film 4 is formed over the metal film 3 the ITO film as the common electrode 2 and the upper common electrode 2A. Silicon nitride (SiN) is suitable as this gate insulating film 4, but some other appropriate insulator can be used as well. In the layer over the gate insulating film 4, a semiconductor film 5 is patterned in the TFT part TFT. This semiconductor film 5 has a laminated structure including a layer 5B of amorphous silicon, polysilicon or the like and a doped semiconductor layer 5A over it.

A source electrode 6 and a drain electrode 7 are formed over the semiconductor film 5 with a channel in-between. These source electrode 6 and drain electrode 7 are formed by patterning metal, preferably aluminum, films. A protective insulating film 8 is formed covering the gate insulating film 4 including these source electrode 6 and drain electrode 7 over it. A suitable material for the protective insulating film 8, which may also be called a passivation film (PAS film), is silicon nitride as for the gate insulating film 4. However, some other appropriate insulator can be used as well. Incidentally, though the source electrode 6 and the drain electrode 7 are switched over when in operation, they are fixed in the illustration for the convenience of description.

A pixel electrode 9 made up of ITO is patterned over the protective insulating film 8. The pixel electrode 9 is comb-shaped, and part of it is connected to the drain electrode 7 of TFT through a contact hole bored in the protective insulating film 8. Further in a common wiring part CL, common wiring 11 is connected to the upper common electrode 2A via a through hole bored in the protective insulating film 8 and the gate insulating film 4.

Over the top layer of the main face of this TFT substrate, an alignment film is formed to provide an alignment control function by rubbing or otherwise. After that, the CF substrate is stuck to this TFT substrate, and liquid crystals are sealed in between them to structure a liquid crystal display panel. External circuits including a driving circuit chip are packaged around the TFT substrate constituting the liquid crystal display panel or built into the substrate face. Mechanical parts including a backlight, a print substrate mounted with a display signal control circuit and the like are incorporated into this liquid crystal display panel to assemble a liquid crystal display device.

FIG. 2 illustrates the process of forming the common electrode shown in FIG. 1. In FIG. 2, P-1 represents the sputtering step of an ITO film; P-2 represents the photolithographic step of the ITO film; P-3 represents the etching step of the ITO film; P-4 represents the sputtering step of a metal film; P-5 represents the photolithographic step of the metal film; and P-6 represents the etching step of the metal film. FIGS. 3A to 3F show sections of the TFT substrate matching the steps of processing illustrated in FIG. 2. FIG. 4 is a plan of the TFT substrate after the ITO etching shown in FIGS. 3A to 3F. FIG. 5 is a plan of the TFT substrate after metal etching shown in FIGS. 3A to 3F.

The formation process of the common electrode will be described below with reference to FIG. 2, FIGS. 3A to 3F, FIG. 4 and FIG. 5. First, at the step denoted as P-1 in FIG. 2 (hereinafter to be denoted simply as P-1 and so forth), an ITO film 20 is formed on the main face of a glass substrate 1 (FIG. 3A). Photosensitive resist 21 is applied onto the film, and is patterned as a common electrode at the photolithographic step (denoted simply as "Photo" in the drawing) (P-2, FIG. 3B). After etching the ITO film 20 with the patterned photosensitive resist 21 used as the mask, the photosensitive resist 21 is removed (P-3, FIG. 3C and FIG. 4). FIG. 4 shows the planar shape of the etched ITO pattern. The section along line A-B in FIG. 4 corresponds to FIG. 3C. Aluminum (Al) 30 is sputtered as a metal film over the photosensitive resist 21 (P-4, FIG. 3D) and, after applying photosensitive resist 41, the resist 41 is left in the parts of a gate wiring/electrode 3 and the upper common electrode wiring (common wiring) 2A by masked exposure (P-5, FIG. 3E). This structure is then etched to remove the metal elsewhere than underneath the resist 41 to expose the common electrode 2 (P-6, FIG. 3F and FIG. 5).

Thus, the conventional practice requires two photolithographic steps, one for ITO patterning and the other for the patterning of the gate wiring/electrode metal. Incidentally, a technique by which some or all of the insulating film, electroconductive film and semiconductor film constituting a TFT are formed by direct patterning by ink jet application, in place of sputtered film formation and photolithographic steps in TFT substrate manufacture, is disclosed in Japanese Patent No. 3725169 cited in connection with the present patent application.

Cost saving is a factor of vital importance to liquid crystal display panels constituting liquid crystal display devices for large TV sets. Since patterning by sputtered film formation and photolithography require expensive and large items of manufacturing equipment including vacuum devices for sputtering, exposure masks and developing devices, reductions in sputtered film formation and photolithography could directly contribute to reductions in manufacturing cost.

Direct patterning of thin films by ink jet application disclosed in Japanese Patent No. 3725169 is claimed to achieve patterning accuracy to the order of 10 µm. As the size of one pixel of a liquid crystal display panel for TV use is relatively large, about 500 µm×170 µm, theoretically the pixel electrode and other elements seem to be directly formed by ink jet application. However, the ink for use in ink jetting is a solution in which a thin film material is dispersed, and therefore ink drips dropped from the nozzle wet-spreads over the surface onto which the drips have fallen, making it difficult to accurately control the outer periphery of the applied edge.

In trying to reduce the number of steps of sputtered film formation and photolithography for manufacturing liquid crystal display panels of a type in which a comb-shaped pixel electrode having common electrodes, one solidly formed for each pixel, is disposed over the main face of a glass substrate via an insulating film, if the common electrode greater in square measure than the pixel electrode can be formed by ink jet application, a significant contribution can be made to cost saving. However, to prevent short-circuiting between wiring lines and inter-layer stray conductance, the patterning of the common electrodes should be accurate to 5 µm or even below, and no such accurate patterning can be achieved by the ink jet application according to Japanese Patent No. 3725169.

SUMMARY OF THE INVENTION

An object of the present invention is to provide a liquid crystal display panel of a type having common electrodes, one solidly formed for each pixel, over the main face of an insulating substrate of glass or the like and a comb-shaped pixel electrode over the common electrodes via an insulating film, the patterning of the common electrodes being accomplished without using sputtered film formation or a photolithographic step, and a manufacturing method thereof.

The problems noted above can be typically addressed by the present invention in one or another of the following ways.

(1) A liquid crystal display device having an effective display area over the main face of whose insulating substrate a large number of pixels made up of thin film transistors are arranged in a matrix, further having a gate wiring/electrode formed over the main face of the insulating substrate, common electrode wiring and a bank regulating the external edges of common electrodes together with part of the common electrode wiring and the common electrode wiring in the same layer as this gate wiring/electrode, and common electrodes each formed of a coating type electroconductive film inside the bank.

(2) A manufacturing method for a liquid crystal display device having an effective display area over the main face of whose insulating substrate a large number of pixels made up of thin film transistors are arranged in a matrix, including the steps of forming, in the aperture part of the pixels of the insulating substrate constituting a liquid crystal display panel, a bank for common electrodes simultaneously with a gate wiring/electrode and common electrode wiring; and applying a coating type electroconductive solution to the inside surrounded by the bank, and baking the same to form the common electrodes.

(3) A liquid crystal display device having an effective display area over the main face of whose insulating substrate a large number of pixels made up of thin film transistors are arranged in a matrix, further having a gate wiring/electrode formed over the main face of the insulating substrate, common electrode wiring and a bank of an organic film regulating the external edges of common electrodes together with part of the common electrode wiring and the common electrode wiring in the same layer as this gate wiring/electrode, and the common electrodes each formed of a coating type electroconductive film, the gate wiring/electrode and the common electrode wiring inside the bank.

(4) A manufacturing method for a liquid crystal display device having an effective display area over the main face of whose insulating substrate a large number of pixels made up of thin film transistors are arranged in a matrix, including the steps of forming, in the aperture part of the pixels of the insulating substrate constituting the liquid crystal display panel, a bank of a circular closed-circuit pattern for the common electrodes by applying photosensitive resist and a groove-shaped bank for a gate wiring/electrode and common electrode wiring; and applying a coating type electroconductive solution to the inside surrounded by the banks, and baking the same to form the common electrodes, the gate wiring/electrode and common electrode wiring.

(5) A liquid crystal display device having an effective display area over the main face of whose insulating substrate a large number of pixels made up of thin film transistors are arranged in a matrix, further having a gate wiring/electrode formed over the main face of the insulating substrate, common electrode wiring and a bank of an inorganic film regulating the external edges of common electrodes together with part of the common electrode wiring and the common electrode wiring in the same layer as this gate wiring/electrode, and the common electrodes each formed of a coating type electroconductive film, the gate wiring/electrode and the common electrode wiring inside the bank.

As the invention requires for the formation of the common electrodes no sputtered film formation or photolithographic step specifically for this electrode, it enables an overall cost reduction by curtailing the manufacturing cost of TFT substrates and the required investments in facilities and equipment.

DETAILED DESCRIPTION OF THE PREFERRED EMBODIMENTS

Preferred embodiments of the present invention will be described in detail below with reference to drawings thereof. Whereas the invention is applied to liquid crystal display panels so structured that common electrodes, each formed of a transparent electroconductive film, are disposed in the bottom layer of the main face of the TFT substrate, this is not the only possible application, and the invention can be applied to the formation of a thin film required to have similar functions and accuracy.

Embodiment 1

Figure 1:
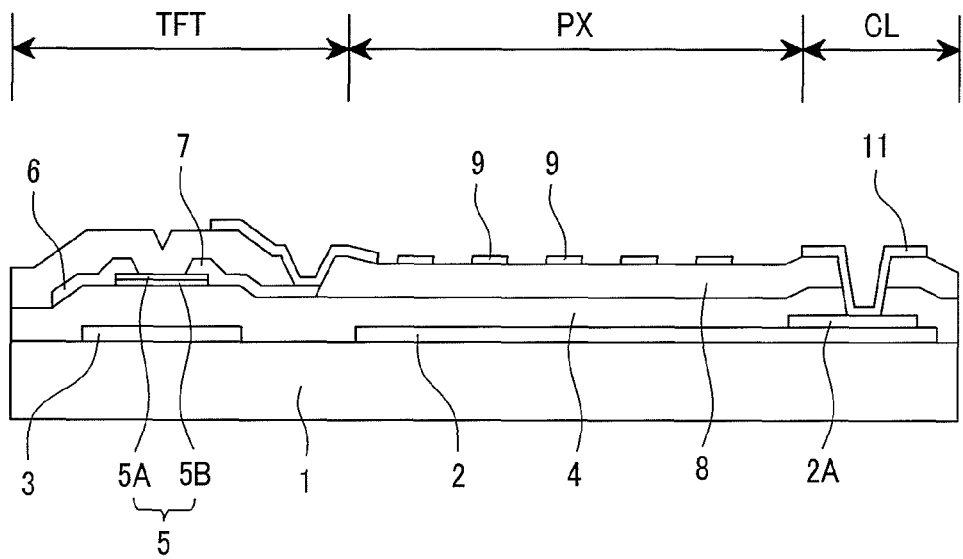
FIG. 1 shows a section of one pixel to illustrate a structural example of a conventional the TFT substrate.
Figure 2:
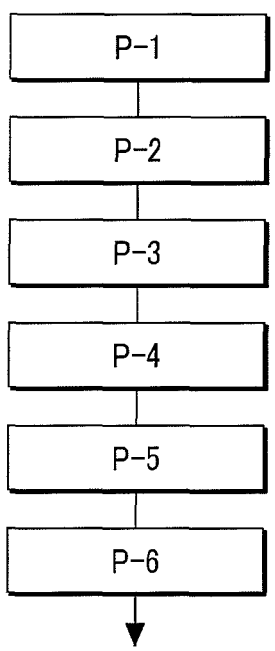
FIG. 2 illustrates the process of forming the common electrode shown in FIG. 1.
Figure 3A:
FIGS. 3A to 3F show sections of the TFT substrate matching the steps of processing illustrated in FIG. 2.
Figure 3B:
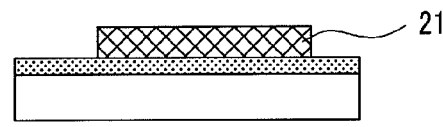
Figure 3C:
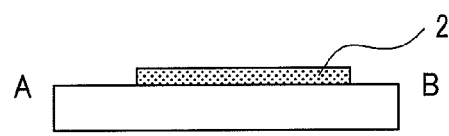
Figure 3D:
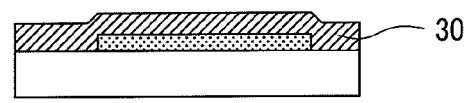
Figure 3E:
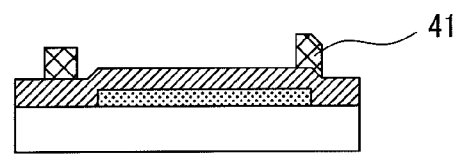
Figure 3F:
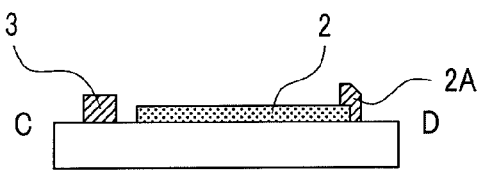
Figure 4:
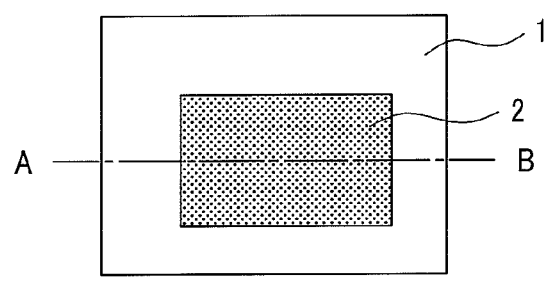
FIG. 4 is a plan of the TFT substrate after the ITO etching shown in FIGS. 3A to 3F.
Figure 5:
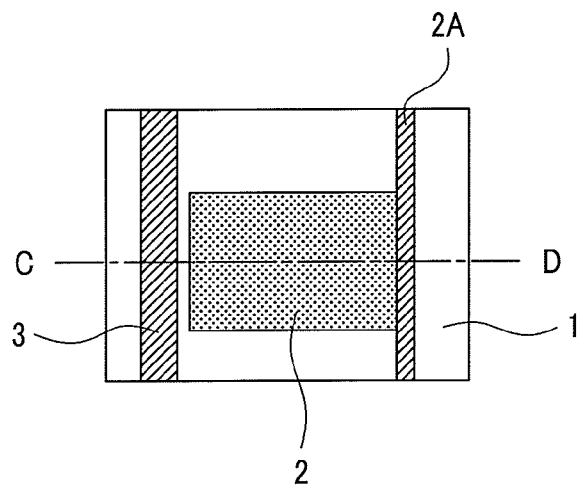
FIG. 5 is a plan of the TFT substrate after metal etching shown in FIGS. 3A to 3F.
Figure 6:
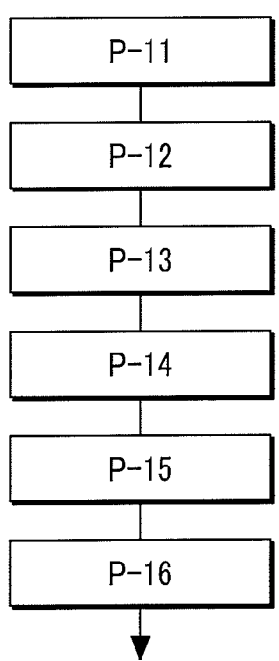
FIG. 6 is a process chart illustrating the essential part of the process in Embodiment 1 of the invention.
Figure 7A:
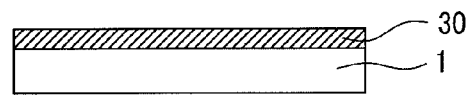
FIGS. 7A to 7E show sections of the TFT substrate matching the steps in the essential part of the process illustrated in FIG. 6.
Figure 7B:
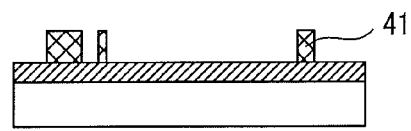
Figure 7C:
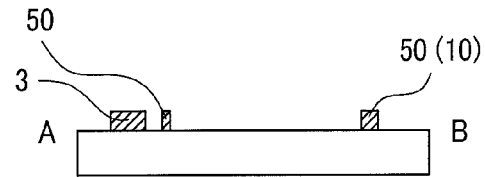
Figure 7D:
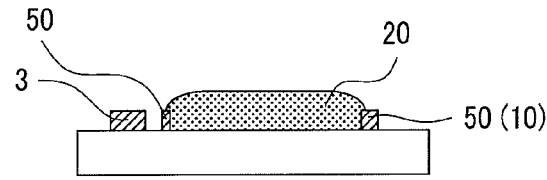
Figure 7E:
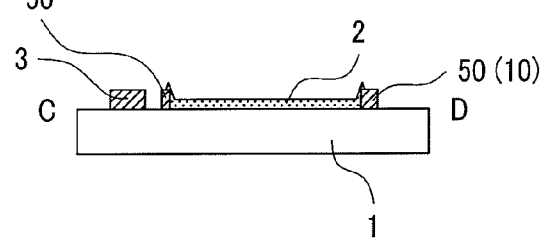
Figure 8:
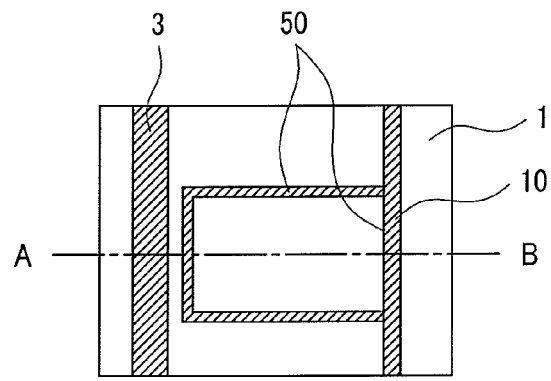
FIG. 8 shows a plan of a state in which a bank for forming a gate wiring/electrode and common electrode wiring also constituting part of this bank are formed.
Figure 9:
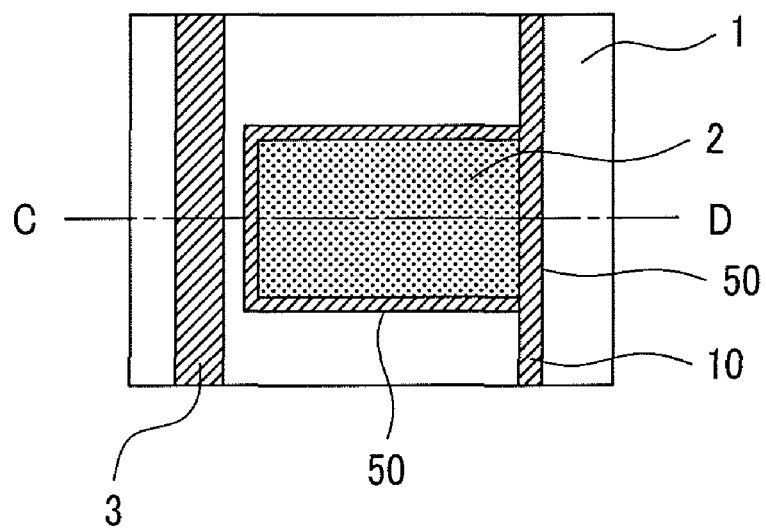
FIG. 9 shows a plan of a state in which the common electrode whose shape is regulated by the bank for common electrode formation is formed.

FIG. 6 is a process chart illustrating the essential part of the process in Embodiment 1 of the invention. In FIG. 6, P11 denotes the formation step of the metal film; P12 denotes the step of resist application; P13 denotes the photolithographic step; P14 denotes the metal film etching step; P15 denotes the step of ITO application; and P16 denotes the step of drying and baking the ITO film. FIGS. 7A to 7E show sections of the TFT substrate matching the steps in the essential part of the process illustrated in FIG. 6. FIGS. 7A, 7B, 7C, 7D and 7E respectively match process steps (P-11), (P-13), (P-14), (P-15) and (P-16) in FIG. 6. FIG. 8 shows a plan of a state in which a bank for forming a gate wiring/electrode and common electrode wiring also constituting part of this bank are formed, and FIG. 9 shows a plan of a state in which the common electrodes whose shape is regulated by the bank for common electrode formation is formed.

At the process step (P-11) in FIG. 6, the metal film 30 of aluminum Al is formed by sputtering on the washed surface of the glass substrate 1. The metal film may as well be made of an aluminum-neodymium alloy or the like, or one of various metals to be described afterwards. Over this metal film 30, photosensitive resist is applied (P-12), and resist 41 is left in the gate wiring/electrode and bank (including the part of common wiring) parts at the photolithographic step including masked exposure and development (P-13). The metal film 30 is wet-etched with the resist 41 used as the etching mask, and the metal film 30 is left in the gate wiring/electrode 3 and bank (including the part of the common wiring 10) 50 as also shown in FIG. 8 (P-4). Electroconductive ink 20 made up of a solution in which ITO (in a particulate form) is dispersed as a coating type transparent electroconductive film material is applied to the inside of the bank (including the part of the common wiring 10) 50 part by ink jetting (P-5). This material is dried and baked to obtain a transparent common electrode 2 (P-6). The peripheral edge of the common electrode 2 is regulated by the bank 50. As the bank 50 is accurately patterned at the photolithographic step, the common electrode whose outer edge is regulated by this bank 50 is formed at an accuracy level of 5 µm or even below as stated above.

Although wet etching is used here, dry etching with gas can as well be used. The applicable metals include, besides aluminum (Al) and aluminum-neodymium (Al—Nd), copper (Cu), titanium (Ti), chromium (Cr), molybdenum (Mo), nickel (Ni), tungsten (W), silver (Ag) and gold (Au), used either singly or in an alloy form and in a plurality of layers as required. The film is to be formed in a thickness of 30 nm to 500 nm with a resistance of not above 10 μΩcm.

The pattern of the bank is to be so shaped as to surround the pixel area. The common electrode wiring (common wiring) is formed together with the gate wiring/electrode and the bank, and this common wiring constitutes part of the bank. The area surrounded by the bank over the glass substrate 1 corresponds to a one-pixel transmitting part. A coating type transparent electroconductive film material is so applied by ink jetting as to fill the inside of the bank. The transparent electroconductive film material may as well be applied to the inside of the bank otherwise than ink jetting, by offset printing for instance.

The solution of coating type transparent electroconductive film material may be what is obtained by dissolving in a solvent a precursor to ITO or some other transparent electroconductive material (the precursor here is what is turned into ITO by providing energy by heating or irradiation with light after application) or by dispersing particulates of 5 to 50 nm in average grain size in a solvent. The solvent for these particulates can be selected from alcohols, ketones, glycol ethers, acyclic hydrocarbons and aromatic hydrocarbons, to which a dispersant or a stabilizer is added. As this kind of solution, for instance the DX-400 Series by product name are available from Sumitomo Metal Mining Co., Ltd.

When a solution of transparent electroconductive film material is merely applied onto a flat glass substrate by ink jetting, its wettability with the surface of the substrate (the relationship between the substrate surface and the surface energy of the solution) may prevent exact definition of the end part (the position of the outer edge) of the coat pattern. In this embodiment, however, as the ink is intercepted by the level gap of the metal constituting the bank, a shape following the pattern of the bank can be formed. The bank can be patterned to be accurate to ±2 μm, the tolerance range of patterning the metal by photolithography.

After the solution of the transparent electroconductive material is applied by dripping, the solvent is removed to some extent by tentative baking at 200° C. or below, followed by baking at 200 to 450° C. This causes an electroconductive thin film of ITO to be formed. This thin film of ITO has a sheet resistance of about 1 to 500 mΩcm at a film thickness of 100 nm and a transmissivity of 90% or above.

In the formation of a transparent electroconductive film of ITO or the like by conventional sputtering, the efficiency of the utilization of the material such as ITO is only 50% at the maximum and, moreover, 20 to 40% of the film after its formation by patterning is removed, but the use of application by ink jetting as in Embodiment 1 of the present invention enables 80 to 90% of the material to be effectively used, thereby making possible cost saving through more efficient use of material.

FIGS. 10A to 10I show in the sequence of steps sections of the TFT substrate formation process after the formation of the common electrode. FIG. 11 shows a plan of a one-pixel part matching FIG. 10A similar to FIG. 9; FIG. 12 shows a plan of a one-pixel part matching FIG. 10E; and FIG. 13 shows a plan of a one-pixel part matching FIG. 10(f).

Figure 10:
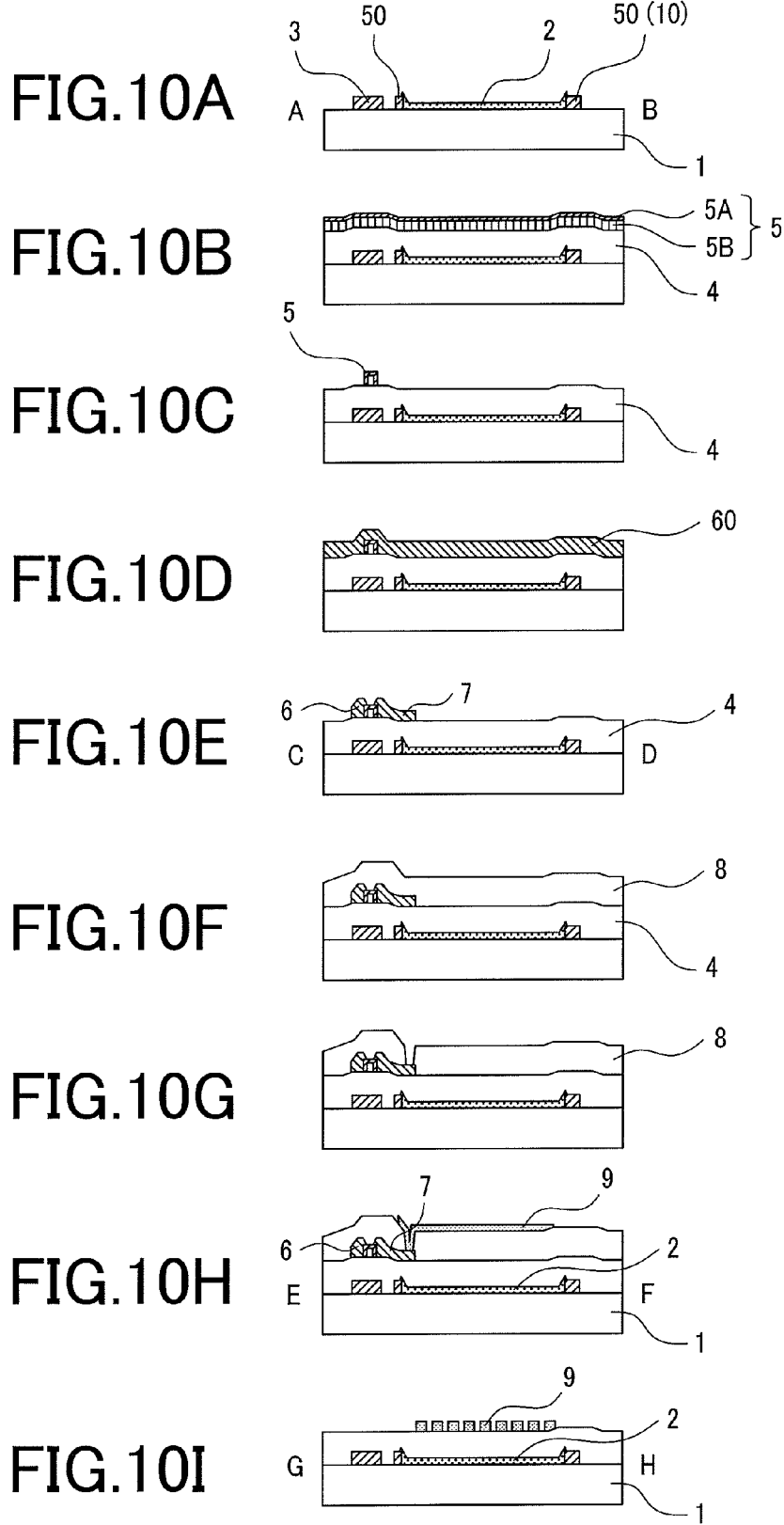
FIGS. 10A to 10I show in the sequence of steps sections of the TFT substrate formation process after the formation of the common electrode.
Figure 11:
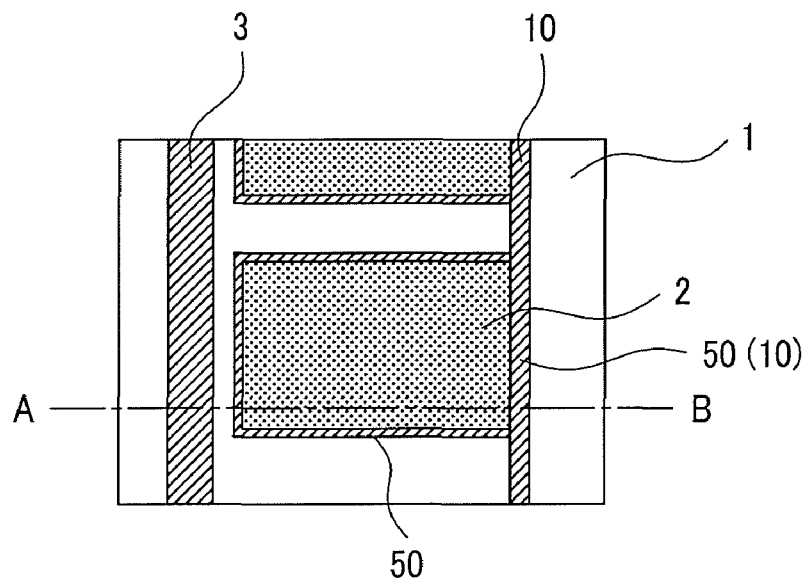
FIG. 11 shows a plan of a one-pixel part matching FIG. 10A similar to FIG. 9.
Figure 12:
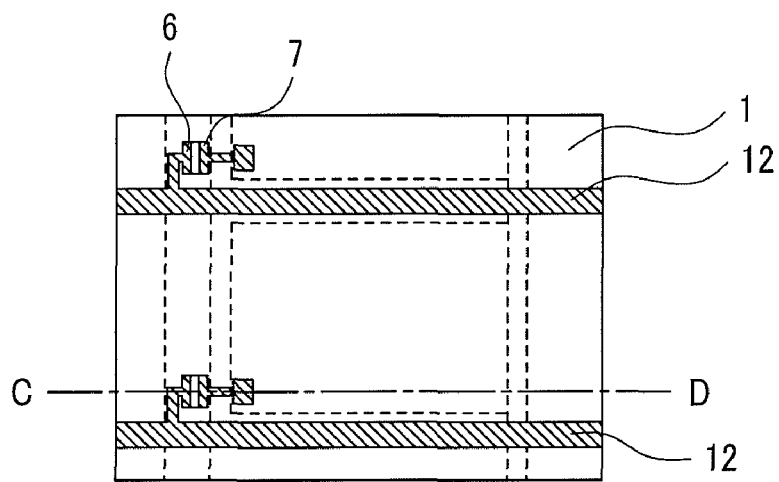
FIG. 12 shows a plan of a one-pixel part matching FIG. 10E.
Figure 13:
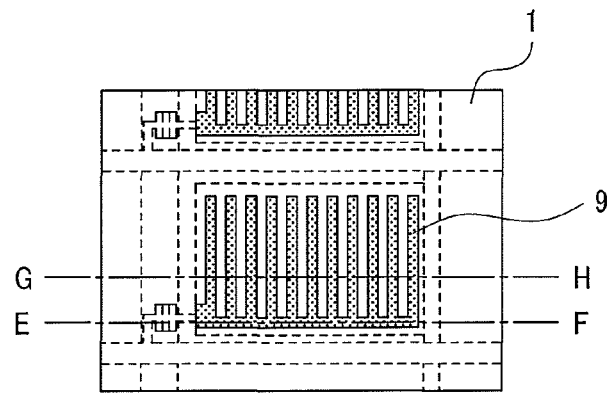
FIG. 13 shows a plan of a one-pixel part matching FIG. 10F.

Referring to FIGS. 10A through 13, SiN is formed by CVD as the gate insulating film 4 (FIG. 10B) over the TFT substrate over which a common electrode 2 is formed (FIG. 10A and FIG. 11). The reaction gases for the formation of this gate insulating film 4 are SiH$_4$ and NH$_3$, and nitrogen gas N$_2$ is used as the buffer gas. The gate insulating film 4 is formed to a thickness of 300 to 500 nm. After that, as the semiconductor film 5, an amorphous silicon (a-Si) layer 5B and an n-doped amorphous silicon (a-Si) layer 5A are formed by CVD (FIG. 10B). Only the semiconductor layers 5 are patterned by photolithography and dry etching (FIG. 10C).

Next, a source-drain wiring metal film 60 is formed by puttering (FIG. 10D), and a source electrode 6 (and source wiring or a data line 12) and a drain electrode 7 are formed by patterning (FIG. 10E and FIG. 12). The suitable metals for the source-drain wiring metal film include, besides aluminum (Al) and aluminum-neodymium (Al—Nd), copper (Cu), titanium (Ti), chromium (Cr), molybdenum (Mo), nickel (Ni), tungsten (W), silver (Ag) and gold (Au), used either singly or in an alloy form and in a plurality of layers as required.

Over this film, SiN is formed by CVD as the protective insulating film (PAS film) 8 to a thickness of 300 to 500 nm (FIG. 10F), and a through hole is so formed in the protective insulating film 8 by photolithography as to connect a pixel electrode and the drain line (FIG. 10G).

Further a transparent electroconductive film is formed as the pixel electrode 9 to a thickness of 30 to 200 nm, and patterned into a comb shape to generate a transverse electric field (FIG. 10H, FIG. 10I and FIG. 13). As the material for the transparent electroconductive film 9, which is formed by sputtering, ITO, SnO$_2$, ZnO, or Al-doped ZnO can be used. The section along line E-F in FIG. 13 matches FIG. 10H, and that along line G-H matches FIG. 10I.

Figure 14:
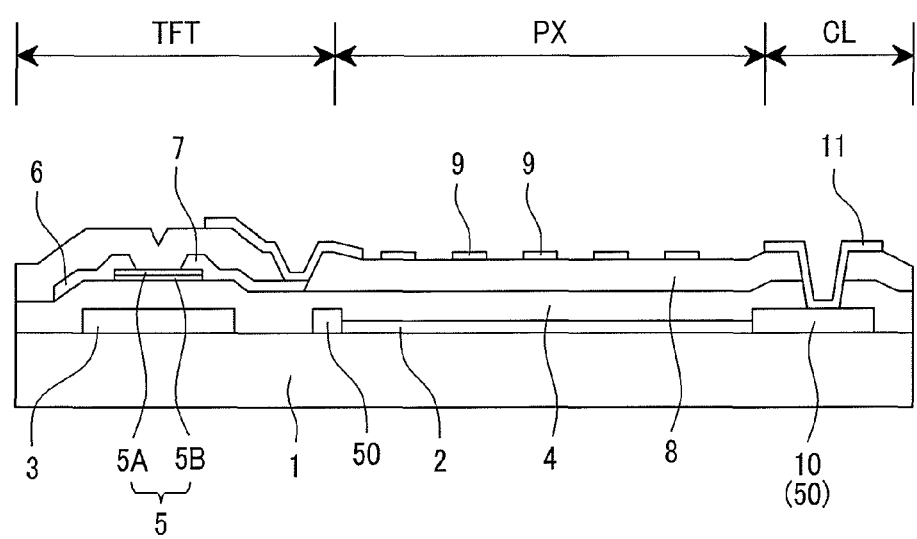
FIG. 14 shows a section of one pixel to illustrate a structural example of the TFT substrate constituting the liquid crystal display panel of a liquid crystal display device according to the invention.

FIG. 14 shows a section of one pixel to illustrate a structural example of the TFT substrate constituting the liquid crystal display panel of a liquid crystal display device according to the invention. For this TFT substrate 1, an inorganic substrate of glass or the like or an organic film of heat resistant plastic or the like is used, and a thin film transistor TFT, a pixel electrode and common electrodes are formed on its main face. In the following description, the use of a transparent glass substrate as the substrate 1 is supposed. Referring to FIG. 14, the TFT part TFT has the gate electrode 3 of a metal film over the main face of the glass substrate 1. In a pixel aperture part PX, there is an ITO film as the common electrode 2 on the same layer as the gate electrode 3. In a common wiring part (a power feed part for the common electrode) CL, common electrode wiring 10 made up of a metal film is formed. This common electrode wiring 10 constitutes part (one side) of the bank 50.

The gate insulating film 4 is formed covering the gate wiring/electrode 3, the ITO film as the common electrode 2 and the common electrode wiring 10. A suitable material for this gate insulating film 4 is silicon nitride SiN, but some other appropriate insulator can be used as well. In the layer above the gate insulating film 4, the semiconductor film 5 is patterned over the TFT part TFT. This semiconductor film 5 has a laminated structure including a layer 5B of amorphous silicon (or possibly of polysilicon or the like) and a doped semiconductor layer 5A over it.

In the upper part of the semiconductor film 5, a source electrode 6 and a drain electrode 7 are formed with a channel in-between. These source electrode 6 and drain electrode 7 are formed by patterning metal films, preferably of aluminum. The protective insulating film (PAS film) 8 is formed covering the gate insulating film 4 including the upper layer of these source electrode 6 and drain electrode 7. The protective insulating film 8 may preferably be formed of silicon nitride similarly to the gate insulating film 4. However, the material may as well be some other suitable insulator.

The pixel electrode 9 made up of ITO is patterned over the protective insulating film 8. The pixel electrode 9 is comb-shaped, and part of it is connected to the drain electrode 7 of TFT through a contact hole bored in the protective insulating film 8. In the common wiring part CL, the common wiring 10 is connected to common electrode power feed line (not shown) via a contact 11 of a through hole bored in the protective insulating film 8 and the gate insulating film 4.

Covering the top layer of the main face of this TFT substrate, an alignment film (not shown) is formed to provide an alignment control function by rubbing or otherwise. After that, the CF substrate is stuck to this TFT substrate, and liquid crystals are sealed in between them to structure a liquid crystal display panel. External circuits including a driving circuit chip are packaged around the TFT substrate constituting the liquid crystal display panel or built into the substrate face. Mechanical parts including a backlight, a print substrate mounted with a display signal control circuit and the like are incorporated into this liquid crystal display panel to assemble a liquid crystal display device.

Embodiment 2

Figure 15:
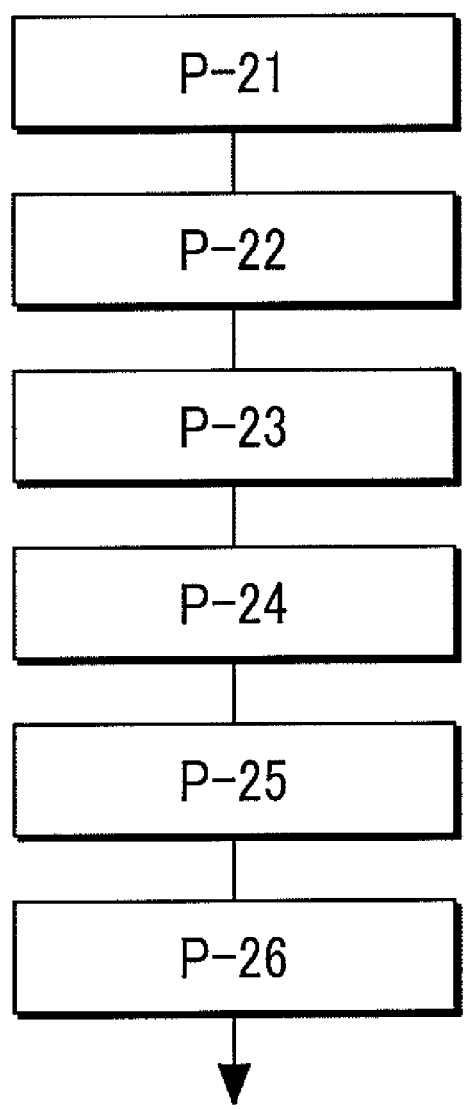
FIG. 15 is a process chart illustrating the essential part of the process in Embodiment 2 of the invention.
Figure 17:
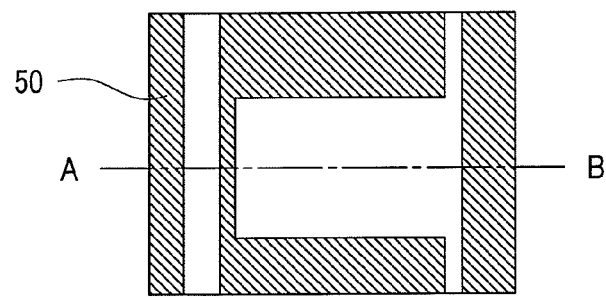
FIG. 17 shows a plan of FIG. 16C.
Figure 18:
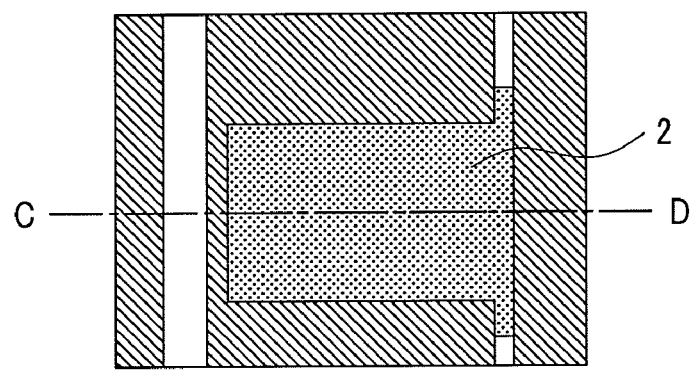
FIG. 18 shows a plan of FIG. 16E.
Figure 19:
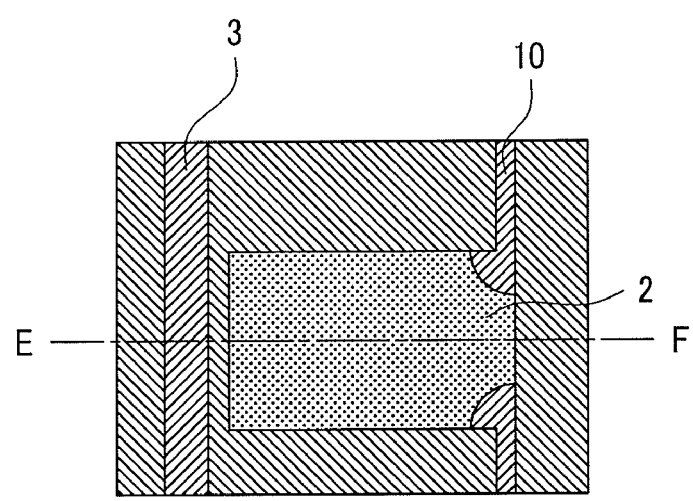
FIG. 19 shows a plan of FIG. 16F.

FIG. 15 is a process chart illustrating the essential part of the process in Embodiment 2 of the invention. In FIG. 15, P21 denotes the formation step of a photosensitive organic film; P22 denotes the photolithographic step; P23 denotes the step of ITO application; P24 denotes the ITO baking step; P25 denotes the step of metal paste application; and P26 denotes the step of baking the metal paste. FIGS. 16A to 16F show sections of the TFT substrate matching the steps in the essential part of the process illustrated in FIG. 15. FIGS. 16A, 16B, 16C, 16D and 16E respectively match process steps (P-1), (P-2), (P-3), (P-4), (P-5) and (P-6) in FIG. 15. FIG. 17 shows a plan of FIG. 16C; FIG. 18 shows a plan of FIG. 16E; and FIG. 19 shows a plan of FIG. 16F.

Figure 25:
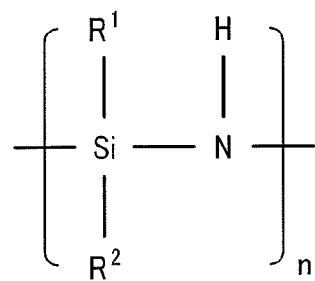
FIG. 25 shows the primary structure of polysilazane.

In the process illustrated in FIG. 15 (P-21, FIG. 16A), a photosensitive organic film 50A is formed by spin coating over the washed surface of the glass substrate 1. What is obtained by adding a photoacid generator to polysilazane can be used as the photosensitive organic film 50A. Polysilazane, whose primary structure is shown in FIG. 25, is a positive photosensitive material which becomes soluble in a developer when its bonds are cut off by heat generated by irradiation with light. While the thickness of the photosensitive organic film 50A is required to be not less than 50 nm to enable it to function as a barrier to the jetted ink, too great a thickness would make the wiring and other elements formed over it susceptible to cracking, and experience suggests the desirability of a thickness not greater than 200 nm.

Whereas spin coating is a method of forming a uniform high quality coat over the surface of a substrate, the photosensitive organic film 50A may as well be formed by any other method that can provide a comparable coat by slit coating or ink jetting. The coat of the photosensitive organic film 50A is pre-baked, and subjected to photolithography (exposure and development) using exposure masks 13 (P-22, FIG. 16B) matching the patterns of the gate wiring/electrode, common electrode and common wiring to form an aperture pattern matching the patterns of the gate wiring/electrode, common electrode and common wiring (P-22, FIG. 16C). The photosensitive organic film aperture pattern constitutes a bank 50 for forming the gate wiring/electrode, common electrode and common wiring.

Figure 16A:
FIGS. 16A to 16F show in the sequence of steps sections of the TFT substrate matching the essential part of the process chart shown in FIG. 15.
Figure 16B:
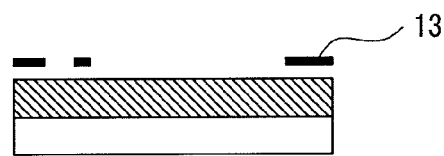
Figure 16C:
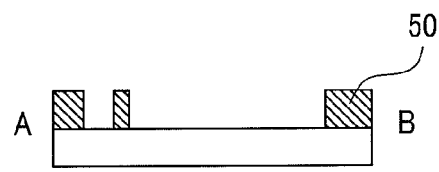
Figure 16D:
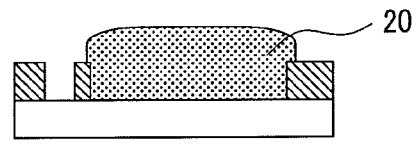
Figure 16E:
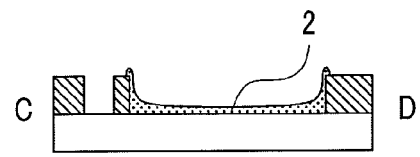
Figure 16F:
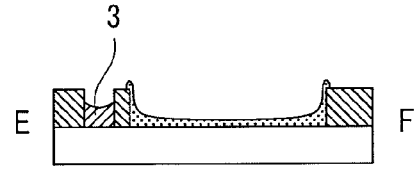

Out of this photosensitive organic film aperture pattern, electroconductive ink 20 prepared by dispersing in a solution (particulates of) ITO as a coating type transparent electroconductive film material in the groove-shaped bank 50 forming the common electrode is applied by ink jetting (P-23, FIG. 16D). The bank 50 of the electroconductive ink 20 and the photosensitive organic film 50A, after removing the solvent to some extent by tentative baking at a temperature of 200° C.

or below, is baked at 200 to 450° C. to obtain the common electrode 2 and harden the bank (P-24, FIG. 16E and FIG. 18). This thin film of ITO has a sheet resistance of about 1 to 500 mΩcm at a film thickness of 100 nm and a transmissivity of 90% or above.

Next, an electroconductive solution (ink) prepared by dispersing in a solvent metal particles is applied by ink jetting or otherwise into the groove-shaped bank forming the gate wiring/electrode and common wiring (P-25). As the solute of the electroconductive solution, aluminum (Al), aluminum-neodymium (Al—Nd), silver (Ag) or gold (Au), and as the solvent, any suitable one of alcohols, ketones, glycol ethers, acyclic hydrocarbons and aromatic hydrocarbons can be used, to which a dispersant or a stabilizer is added. Commercially available inks of this kind include Ag nano-particle ink manufactured by Harima Chemicals, CIMA or Cabot. After dripping this solution, the bank is baked at a temperature of 150° C. to 250° C. to obtain a gate wiring/electrode 3 and common wiring 10 of 30 to 500 nm in film thickness and not more than 10 μΩcm in resistance (P-26, FIG. 16F and FIG. 19). A shown in FIG. 19, the common wiring 10 is so formed as to have conduction to part of the common electrode 2 having infiltrated into the groove-shaped bank.

Incidentally, the solution of coating type transparent electroconductive film material may be what is obtained by dissolving in a solvent a precursor to ITO, IZO or some other transparent electroconductive material (the precursor here is what is turned into ITO or IZO by providing energy by heating or irradiation with light after application) or by dispersing in a solvent particulates of 5 to 50 nm in average grain size. The solvent for these particulates can be selected from alcohols, ketones, glycol ethers, acyclic hydrocarbons and aromatic hydrocarbons, to which a dispersant or a stabilizer is added. As this kind of solution, for instance the DX-400 Series by product name are available from Sumitomo Metal Mining Co., Ltd.

When a solution of transparent electroconductive film material is merely applied onto a flat glass substrate by ink jetting, its wettability with the surface of the substrate (the relationship between the substrate surface and the surface energy of the solution) may prevent exact definition of the end part (the position of the outer edge) of the coat pattern. In this embodiment, however, as the ink is intercepted by the bank, a shape following the pattern of the bank can be formed. The patterning accuracy of the electrode is defined by the accuracy of the patterning of the bank by photolithography.

FIGS. 20A to 20H show in the sequence of steps sections of the TFT substrate after the formation of the common electrode. Incidentally, the common electrode used here is what was formed in Embodiment 1. FIG. 21 shows a plan of a one-pixel part matching FIG. 16F; FIG. 22 shows a plan of a one-pixel part matching FIG. 20E; and FIG. 23 shows a plan of a one-pixel part matching FIG. 20H.

Figure 20A:
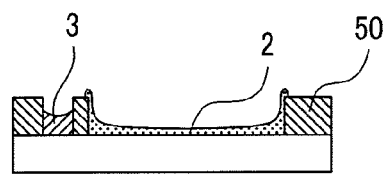
FIGS. 20A to 20H show in the sequence of steps sections of the TFT substrate after the formation of the common electrode.
Figure 20B:
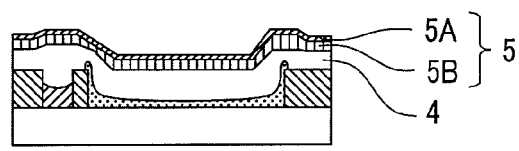
Figure 20C:
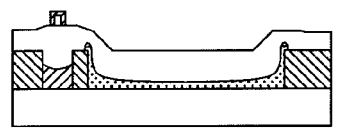
Figure 20D:
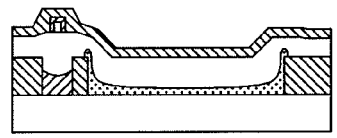
Figure 20E:
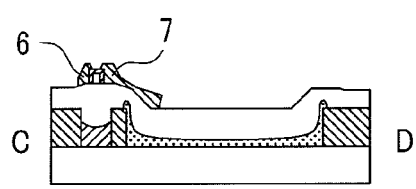
Figure 20F:
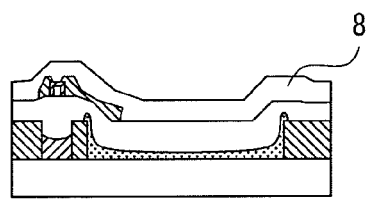
Figure 20G:
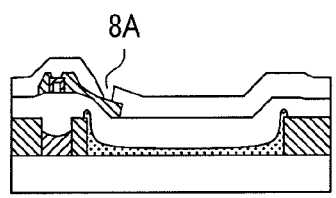
Figure 20H:
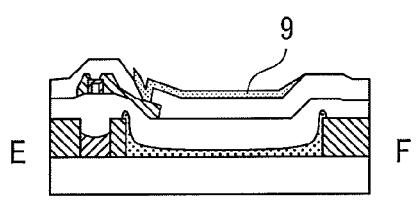
Figure 21:
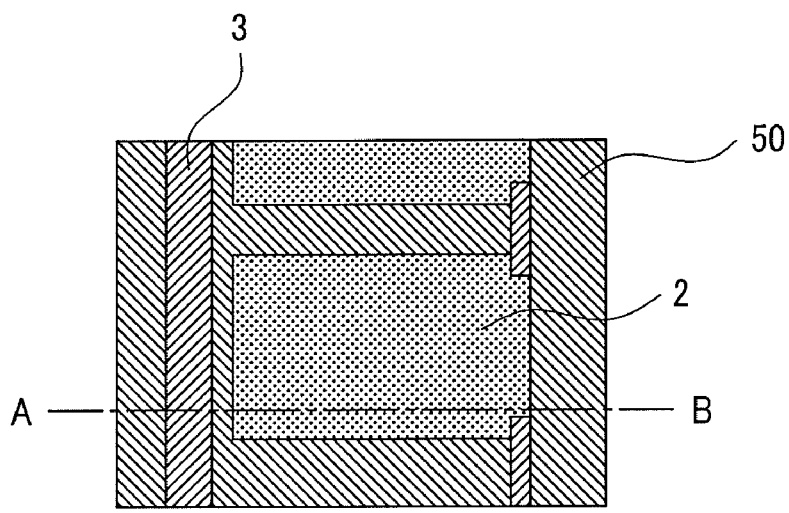
FIG. 21 shows a plan of a one-pixel part matching FIG. 16F.
Figure 22:
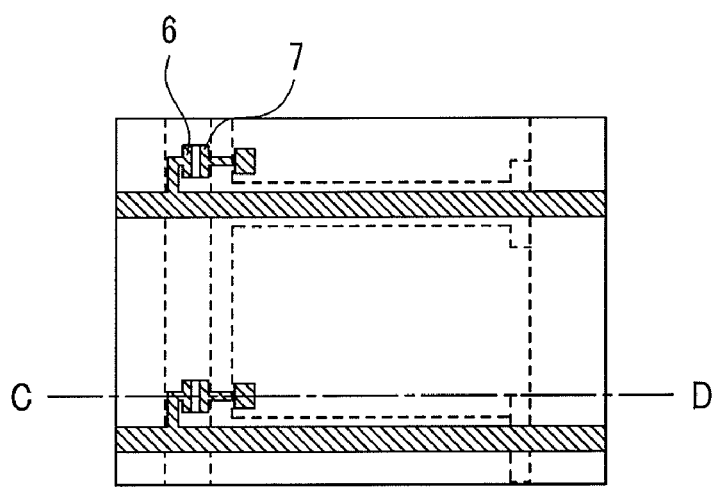
FIG. 22 shows a plan of a one-pixel part matching FIG. 20E.
Figure 23:
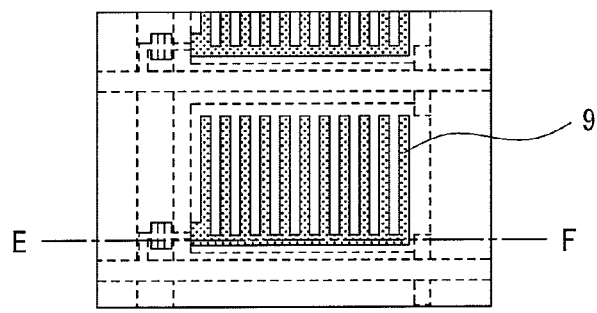
FIG. 23 shows a plan of a one-pixel part matching FIG. 20H.

Referring to FIGS. 20A through 23, SiN is formed by CVD as the gate insulating film 4 (FIG. 20B) over the TFT substrate over which the common electrode 2 is formed (FIG. 20A and FIG. 21). The reaction gases for the formation of this gate insulating film 4 are $SiH_4$ and $NH_3$, and nitrogen gas $N_2$ is used as the buffer gas. The gate insulating film 4 is formed to a thickness of 300 to 500 nm. After that, as the semiconductor film 5, the amorphous silicon (a-Si) layer 5B and the n-doped amorphous silicon (a-Si) layer 5A are formed by CVD (FIG. 20B). Only the semiconductor layers 5 are patterned by photolithography and dry etching (FIG. 20C).

Next, the source-drain wiring metal film 60 is formed by sputtering (FIG. 20D), and the source electrode 6 (and source wiring or the data line 12) and the drain electrode 7 are formed by patterning (FIG. 20E and FIG. 22). The suitable metals for the source-drain wiring metal film, besides aluminum (Al) and aluminum-neodymium (Al—Nd), include copper (Cu), titanium (Ti), chromium (Cr), molybdenum (Mo), nickel (Ni), tungsten (W), silver (Ag) and gold (Au), used either singly or in an alloy form and in a plurality of layers as required.

Over this film, SiN is formed by CVD as the protective insulating film (PAS film) 8 to a thickness of 300 to 500 nm (FIG. 20F), and a through hole is so formed in the protective insulating film 8 by photolithography as to connect the pixel electrode and the drain line (FIG. 20G).

Further a transparent electroconductive film is formed as the pixel electrode 9 to a thickness of 30 to 200 nm, and patterned into a comb shape to generate a transverse electric field (FIG. 20H and FIG. 23). As the material for the transparent electroconductive film 9, which is formed by sputtering, ITO, $SnO_2$, ZnO, or Al-doped ZnO can be used. The section along line E-F in FIG. 23 matches FIG. 20H.

Figure 24:
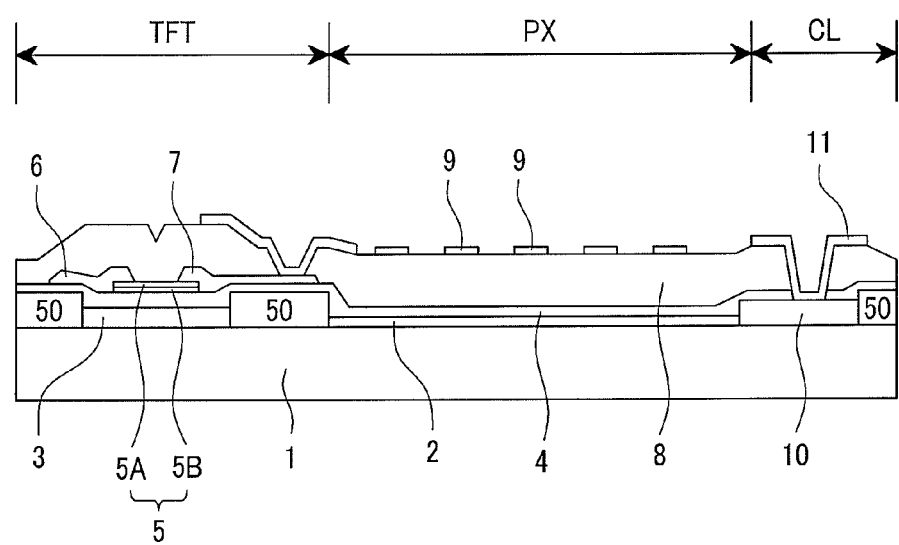
FIG. 24 shows a section of one pixel to illustrate a structural example of the TFT substrate constituting the liquid crystal display panel of a liquid crystal display device according to the invention.

FIG. 24 shows a section of one pixel to illustrate a structural example of the TFT substrate constituting the liquid crystal display panel of a liquid crystal display device according to the invention. For this TFT substrate 1, an inorganic substrate of glass or the like or an organic film of heat resistant plastic or the like is used, and a thin film transistor TFT, a pixel electrode and a common electrode are formed on its main face. In the following description, the use of a transparent glass substrate as the substrate 1 is supposed. Referring to FIG. 24, the TFT part TFT has the gate electrode 3 of a metal film over the main face of the glass substrate 1. In the pixel aperture part PX, there is an ITO film as the common electrode 2 on the same layer as the gate electrode 3. In the common wiring part (a power feed part for the common electrode) CL, common electrode wiring 10 made up of a metal film is formed.

The gate insulating film 4 is formed covering the gate wiring/electrode 3, the ITO film as the common electrode 2 and the common electrode wiring 10. A suitable material for this gate insulating film 4 is silicon nitride SiN, but some other appropriate insulator can be used as well. In the layer above the gate insulating film 4, the semiconductor film 5 is patterned over the TFT part TFT. This semiconductor film 5 has a laminated structure including the layer 5B of amorphous silicon (or possibly of polysilicon or the like) and the doped semiconductor layer 5A over it.

In the upper part of the semiconductor film 5, the source electrode 6 and the drain electrode 7 are formed with a channel in-between. These source electrode 6 and drain electrode 7 are formed by patterning metal films, preferably of aluminum. The protective insulating film (PAS film) 8 is formed covering the gate insulating film 4 including the upper layer of these source electrode 6 and drain electrode 7. The protective insulating film 8 may preferably be formed of silicon nitride similarly to the gate insulating film 4. However, the material may as well be some other suitable insulator.

The pixel electrode 9 made up of ITO is patterned over the protective insulating film 8. The pixel electrode 9 is comb-shaped, and part of it is connected to the drain electrode 7 of TFT through a contact hole bored in the protective insulating film 8. In the common wiring part CL, the common wiring 10 is connected to common electrode power feed line (not shown) via the contact 11 of a through hole bored in the protective insulating film 8 and the gate insulating film 4.

Covering the top layer of the main face of this TFT substrate, an alignment film (not shown) is formed to provide an alignment control function by rubbing or otherwise. After that, the CF substrate is stuck to this TFT substrate, and liquid crystals are sealed in between them to structure a liquid crystal display panel. External circuits including a driving circuit chip are packaged around the TFT substrate constituting the liquid crystal display panel or built into the substrate face. Mechanical parts including a backlight, a print substrate mounted with a display signal control circuit and the like are incorporated into this liquid crystal display panel to assemble a liquid crystal display device.

Embodiment 3

Figure 26:
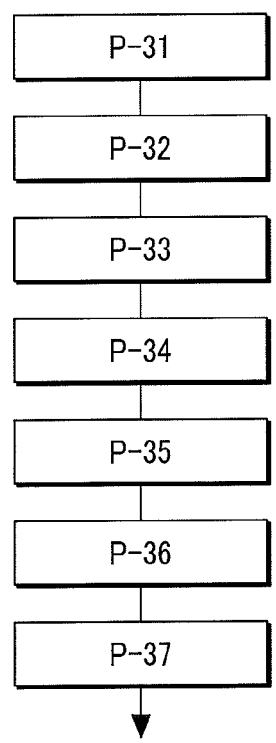
FIG. 26 is a process flow chart illustrating the essential part of the process in Embodiment 3 of the invention.

FIG. 26 is a process flow chart illustrating the essential part of the process in Embodiment 3 of the invention. In FIG. 26, P31 denotes the formation step of an SiN film by CVD; P32 denotes a photolithographic step; P33 denotes the step of dry etching of SiN; P34 denotes the step of applying ITO; P35 denotes the step of drying and baking ITO; P36 denotes the step of applying the metal paste; and P37 denotes the step of baking the metal paste. In Embodiment 3, an inorganic insulating film of silicon nitride or the like is formed by CVD (P-31) in place of the photosensitive resist film formed over the glass substrate in Embodiment 1. This film is subjected to photolithography (P-32) and dry etching (P-33) to form a bank similar to that in Embodiment 2. Following this, the gate wiring/electrode, common electrode and common wiring are formed at processing steps (P-34), (P-35), (P-36) and (P-37) similar to their respective counterparts in Embodiment 2.

After the common electrode has been formed as described above, the TFT, pixel electrode and other elements are formed. Description of the process to form the TFT, pixel electrode and other elements will be dispensed with because it is similar to that in Embodiment 2 described with reference to FIGS. 20A through 23. The sections of one pixel of the TFT substrate formed by using this embodiment are similar to those in Embodiment 2 described with reference to FIG. 24. The difference of this embodiment from Embodiment 2 is that the bank 50 is formed of an inorganic insulating film of silicon nitride or the like instead of a photosensitive resist film.

What is claimed is:

1. A liquid crystal display device having an effective display area over the main face of whose insulating substrate a large number of pixels made up of thin film transistors are arranged in a matrix, further having:
  a gate wiring/electrode formed over the main face of the insulating substrate, common electrode wiring and a bank regulating the external edges of common electrodes together with part of the common electrode wiring and the common electrode wiring in the same layer as the gate wiring/electrode, and
  common electrodes each being formed of a coating type electroconductive film inside the bank;
  wherein the bank regulates the external edges of the common electrodes without overlapping the common electrodes.

2. The liquid crystal display device according to claim 1, wherein the height of the bank from the insulating substrate surface is greater than the height of the common electrodes therefrom.

3. The liquid crystal display device according to claim 1, wherein the heights of the gate wiring/electrode, the common electrode wiring and the common electrodes from the insulating substrate surface are substantially equal.

4. The liquid crystal display device according to claim 1, further having:
  a pixel electrode in the layer above the common electrodes with an insulating film in-between.

5. The liquid crystal display device according to claim 4, wherein the pixel electrode is comb-shaped.

6. The liquid crystal display device according to claim 1, wherein an innermost edge of the bank and the external edges of the common electrodes are provided on a same layer.

7. A liquid crystal display device having an effective display area over the main face of whose insulating substrate a large number of pixels made up of thin film transistors are arranged in a matrix, further having:
- a gate wiring/electrode formed over the main face of the insulating substrate, common electrode wiring and a bank of an organic film regulating the external edges of common electrodes together with part of the common electrode wiring and the common electrode wiring in the same layer as the gate wiring/electrode, and
- the common electrodes each being formed of a coating type electroconductive film, the gate wiring/electrode and the common electrode wiring being provided inside the bank;
- wherein the bank regulates the external edges of the common electrodes without overlapping the common electrodes.

8. The liquid crystal display device according to claim 7, wherein the height of the bank from the insulating substrate surface is greater than the heights of the common electrodes, the gate wiring/electrode and the common electrode wiring therefrom.

9. The liquid crystal display device according to claim 7, wherein the heights of the gate wiring/electrode and the common electrode wiring from the insulating substrate surface are substantially equal.

10. The liquid crystal display device according to claim 7, further having:
- a pixel electrode in the layer above the common electrodes with an insulating film in-between.

11. The liquid crystal display device according to claim 7, wherein the pixel electrode is comb-shaped.

12. The liquid crystal display device according to claim 7, wherein:
- the pixel electrode is connected to the thin film transistor.

13. The liquid crystal display device according to claim 7, wherein an insulation layer which is different from the organic film of the bank is formed on the common electrodes.

14. The liquid crystal display device according to claim 13, wherein an innermost edge of the bank and the external edges of the common electrodes are provided on a same layer.

15. A liquid crystal display device having an effective display area over the main face of whose insulating substrate a large number of pixels made up of thin film transistors are arranged in a matrix, further having:
- a gate wiring/electrode formed over the main face of the insulating substrate, common electrode wiring and a bank of an inorganic film regulating the external edges of common electrodes together with part of the common electrode wiring and the common electrode wiring in the same layer as the gate wiring/electrode, and
- the common electrodes each being formed of a coating type electroconductive film, the gate wiring/electrode and the common electrode wiring being provided inside the bank;
- wherein the bank regulates the external edges of the common electrodes without overlapping the common electrodes.

16. The liquid crystal display device according to claim 15, wherein the height of the bank from the insulating substrate surface is greater than the heights of the common electrodes, the gate wiring/electrode and the common electrode wiring therefrom.

17. The liquid crystal display device according to claim 15, wherein the heights of the gate wiring/electrode and the common electrode wiring from the insulating substrate surface are substantially equal.

18. The liquid crystal display device according to claim 15, further having:
- a pixel electrode in the layer above the common electrodes with an insulating film in-between.

19. The liquid crystal display device according to claim 15, wherein an insulation layer which is different from the inorganic film of the bank is formed on the common electrodes.

20. The liquid crystal display device according to claim 19, wherein an innermost edge of the bank and the external edges of the common electrodes are provided on a same layer.

* * * * *